United States Patent [19]
Bayer et al.

[11] Patent Number: 5,512,756
[45] Date of Patent: Apr. 30, 1996

[54] X-RAY DETECTOR WITH DIRECT CONVERSION

[75] Inventors: Eberhard Bayer, deceased, late of Munich, by Sigrun Bayer, Otmar Bayer, heirs; Andreas Jahnke, Munich; Eric Chemisky, Haar; Ralf-Dieter Schnell, Munich, all of Germany

[73] Assignee: Siemens Aktiengesellschaft, Munich, Germany

[21] Appl. No.: 361,101

[22] Filed: Dec. 21, 1994

[30] Foreign Application Priority Data

Dec. 23, 1993 [DE] Germany .......................... 43 44 252.0

[51] Int. Cl.⁶ .................................. G01T 1/24; G01J 1/24
[52] U.S. Cl. .................. 250/370.13; 250/370.14; 250/370.12; 378/4; 378/22; 378/51; 378/64
[58] Field of Search ................... 250/370.13, 370.14, 250/370.15, 370.12; 378/4, 22, 25, 51, 64, 160, 19

[56] References Cited

U.S. PATENT DOCUMENTS

| | | | |
|---|---|---|---|
| 3,596,151 | 7/1971 | Eldridge et al. | 257/449 |
| 3,636,354 | 1/1972 | Leheny et al. | 250/370.12 |
| 3,825,759 | 6/1974 | Hall | 250/370.01 |
| 4,301,367 | 11/1981 | Hsu | 250/370.13 |
| 4,422,177 | 12/1983 | Mastronardi et al. | 378/10 |
| 4,773,087 | 9/1988 | Plewes | 378/160 |
| 4,774,205 | 9/1988 | Choi et al. | 437/59 |
| 5,068,524 | 11/1991 | Elliott et al. | 250/370.13 |
| 5,262,649 | 11/1993 | Antonuk et al. | 250/370.14 |
| 5,317,190 | 5/1994 | Fleischman et al. | 257/743 |
| 5,391,882 | 2/1995 | Rhiger | 250/320.14 |

FOREIGN PATENT DOCUMENTS

| | | |
|---|---|---|
| 4229315 | 3/1994 | Germany . |
| 2-242190 | 9/1990 | Japan .................. 250/370.13 |

*Primary Examiner*—Constantine Hannaher
*Assistant Examiner*—Virgil O. Tyler
*Attorney, Agent, or Firm*—Hill, Steadman & Simpson

[57] ABSTRACT

An x-ray detector element suitable for use in computer tomography has a semi-insulating semiconductor body composed of a compound semiconductor, and is operated with a constant voltage source so that it functions as an x-ray-sensitive photoconductor. A measurement instrument is connected across the voltage source for detecting the photocurrent, which is indicative of the x-rays incident on the semiconductor body.

10 Claims, 1 Drawing Sheet

PHOTOCONDUCTOR

PHOTOCURRENT MEASURING INSTRUMENT

PROTECTIVE RESISTOR

PHOTOCONDUCTOR

X-RAY DETECTOR WITH DIRECT CONVERSION

BACKGROUND OF THE INVENTION

1. Field of the Invention

The present invention is directed to an x-ray detector element and operating circuitry therefor for use in registering x-rays, particularly for use in computer tomography.

2. Description of the Prior Art

Various demands are made on x-ray detector elements which are used in computer tomography. Such elements should convert x-rays into electrical signals with a high sensitivity and with substantial immunity to interference. Such detectors also should have a large dynamic sensitivity range with a good proportional relationship between the incoming x-ray intensity and the level of the electrical output signal of the detector. The chronological response behavior of the detector should be rapid, and the measured signal should have substantially decayed after approximately one millisecond. Moreover, it is required that such detector elements exhibit good long-term stability.

Known x-ray detectors used in computer tomography employ various physical principles for the detection of the x-rays. Gas-filled ionization chambers make use of the ionizing property of x-rays, and the electrical charges generated in the ionized gas by the incoming x-rays can be directly identified.

Detectors operating according to the scintillator principle employ the luminous properties of various crystalline phosphors which convert the x-rays into visible light, so that the x-rays becomes visible to the human eye, or to a light-sensitive film or a photodetector.

A direct conversion of x-rays into an electrical signal is accomplished, for example, using a pn-diode of monocrystalline germanium semiconductor material. Utilization of the photovoltaic effect for direct detection of x-rays has also been proposed.

Spatially resolving x-ray detectors operating using the ionization chamber principle require a complicated manufacturing technique, and have low efficiency in the conversion of the x-rays into electrical pulses. The use of such detectors therefore requires a relatively high radiation dose, which imposed a high radiation load on the patient to be examined.

Phosphor detectors are basically well-suited for x-ray registration, but can only be structured in a relatively complicated manner. Further problems arise due to the interference-prone connection between the scintillator and the photodetector associated therewith, and electrical loses must also be accepted in the opto-electrical conversion.

Semiconductor diodes formed of germanium require cooling with liquid nitrogen because the relatively small band gap of germanium results in the generation of high thermal noise. Providing for such cooling is especially complicated, particularly in a computer tomography apparatus wherein an array of individual x-ray detectors must be moved around the body to be irradiated.

SUMMARY OF THE INVENTION

It is an object of the present invention to provide an x-ray detector which converts x-rays into electrical signals with high efficiency, which enables a spatial resolution of the incoming x-rays, which is simple to manufacture, and which avoids the above disadvantages of known x-ray detectors.

The object is achieved in accordance with the principles of the present invention in an x-ray detector which includes a crystalline, semi-insulating semiconductor body in the form of lamina, which forms a photoconductor, the semiconductor body being of material selected from the group consisting of:

GaAs, CdTe, CdSe, HgTe, $CuIn_xGa_{1-x}Se_{2-2y}S_{2y}$, wherein $1 \geq x$ and $y \geq 0$.

The semiconductor body has a pair of electrodes on opposite surfaces thereof and has a flat, highly doped layer region directly beneath the electrodes. A constant voltage source is connected to the electrodes for charging the electrodes with a constant voltage. A measurement instrument is provided for detecting the photocurrent which flows through the photoconductor formed by the semiconductor body, as a result of x-rays incident thereon.

Compared to germanium, some compound semiconductors have a more beneficial atomic ratio and, as a result, a higher absorption for x-rays. Such compound semiconductors can be produced in monocrystalline form with good quality and purity. Charge carriers produced by absorbed x-rays in such preferably monocrystalline semiconductors have the longest useful life and the largest mobility. As a result it is assured that a maximum number of the charge carriers can be separated in the applied field without recombining, and can be read out at the electrodes as a measurable current. The high efficiency in absorption and in the direct conversion of x-rays into an electrical signal, in turn, yield a high signal-to-noise ratio of more than $10^3$ for the detector according to the principles of the invention. The higher band gap of such compound semiconductors compared to the band gap of germanium enables operation of the detector elements according to the invention at room temperature.

The semiconductor body of the inventive detector has a high purity in its interior, and is at most compensation-doped, but has a flat, highly doped layer region beneath the electrodes. This assures a good ohmic contact between the semiconductor material and the electrode, and thus results in a uniform and constant electrical field throughout the entire semiconductor body. Compared to a spatially limited Schottky contact or to a pn-junction, for example, a higher drift collection efficiency of the charge carriers is achieved in the detector of the invention, because regions which supply only small diffusion contributions to the charge transport exist in weak-field regions. Moreover, the short life of the minority charge carriers in the semiconductor is important for the photovoltaic principle.

The use of semi-insulating semiconductors as a photoconductor having a typical resistivity $\rho=10^7$ through $10^9$ ohm-cm is particularly beneficial, because such semiconductors barely contain any imperfections which could produce charge carriers which would cause internal field modifications, or which could produce charge compensation effects which would be undesirably long-lasting.

A further important feature of the detector element of the invention is the use of a constant voltage source. This is particularly important because the measured signal is dependent on the voltage applied to the electrodes of the photoconductor. A varying voltage would modify the measured signal and would thus increase the noise, or would degrade the signal-to-noise ratio. A battery or a charge accumulator having an adequate current capacity is suitable, for example, as a constant voltage source. The voltage applied to the electrodes of the photoconductor may, for example, be in a range from 8 to 30 volts, but is below the breakdown voltage in any case. In order to avoid shorting the detector element, the photoconductor is connected in series with a protective resistor. The voltage drop across the protective resistor has the same order of magnitude as the dark resistance of the photoconductor. The measuring instrument is connected in parallel with the photoconductor and is capacitatively coupled thereto for blocking the dark current. In order to maintain a constant potential given largely varying photocurrents, a capacitor can be additionally connected in parallel with the voltage source.

DESCRIPTION OF THE PREFERRED EMBODIMENTS

In an exemplary embodiment of the detector according to the invention, gallium arsenide GaAs is selected as the preferred semiconductor material. Based on the atomic numbers of its elements, this is comparable to germanium for the absorption of x-rays, however, it has a band gap of 1.43 eV, and is therefore significantly better-suited for detector operation at room temperature than is germanium. Gallium arsenide is also the preferred choice from comparable compound semiconductors with respect to the available crystal quality.

A gallium arsenide wafer having a thickness of 0.6 mm and having a resistivity of $2.2 \times 10^7$ ohm-cm is selected for a test set-up.

Figure 1:
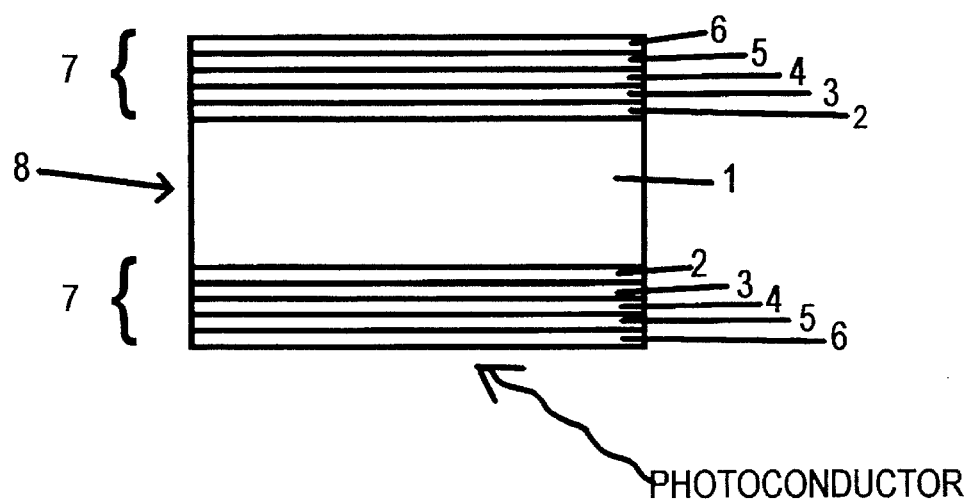
FIG. 1 is a block diagram showing a detector element for x-rays constructed in accordance with the principles of the present invention.

As shown in FIG. 1, layers serving as electrodes are applied as ohmic contacts 7 on both sides of the gallium arsenide wafer forming the semiconductor body 1. To that end, a flat, highly doped region 2 is first produced at the two opposite wafer surfaces. For example, an $n^+$-doping, which is approximately 200 nm deep, is produced by diffusion or implantation. This serves the purpose of improving the collection of charge carriers and facilitates the ohmic contact to the next layer. The next layer is a diffusion barrier 3 for the actual metallic electrode layer. For example, the diffusion barrier 3 may be a 13 nm thick germanium layer deposited for this purpose over the highly doped layer region 2. Next, a first metallic contact layer 4 is applied which may be, for example, a 27 nm thick gold layer. A further diffusion barrier 5 covers the contact layer 4, for example, a 10 nm thick nickel layer. Lastly, the actual electrode layer 6 is provided over the further diffusion barrier 5. The actual electrode layer may, for example, be a 300 nm gold coat.

Standard thin-film techniques can be employed for the deposition of the layers forming the ohmic contact 7, for example, vapor-deposition or sputtering or an electrolytic or currentless metal deposition. The layer combination selected for the ohmic contact layers 7 is known in the art for use as a contact for microwave electronic modules of gallium arsenide. It is possible, however, to employ other electrode materials. A condition, however, is that the electrode materials must form a good ohmic contact to the semiconductor and must be stable over a long term and must not degrade the semiconductor properties by virtue of diffusion during long-term operation.

Figure 2:
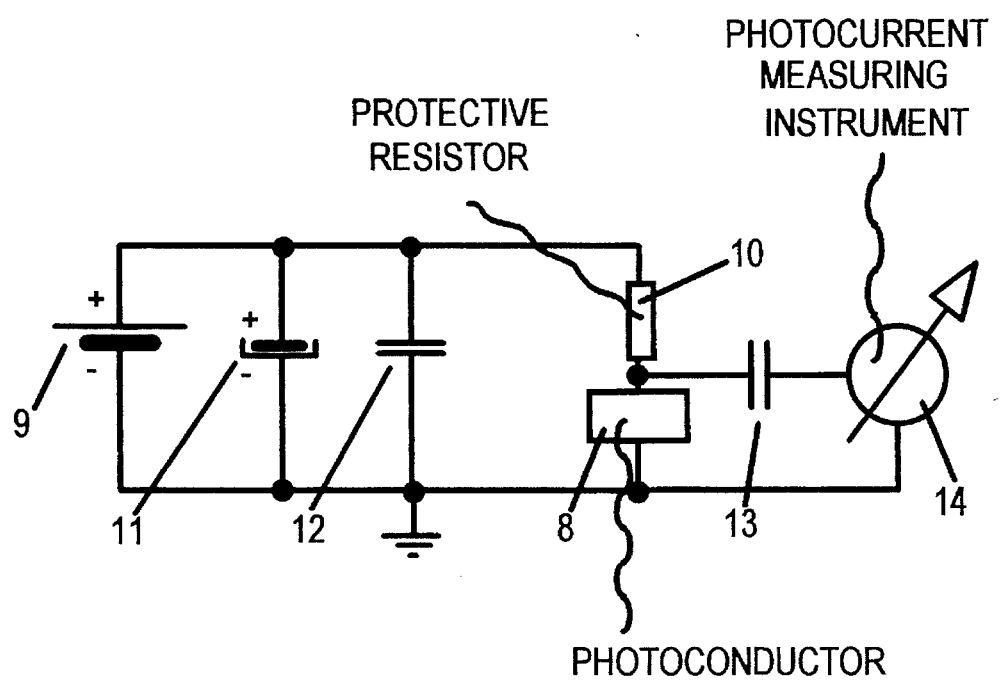
FIG. 2 is a schematic circuit diagram showing the detector element of FIG. 1 connected for operation.

A test member which is approximately 1.5 cm$^2$ in size is selected as a photoconductor 8 and is cut from the semiconductor body 1 provided with the ohmic contacts 7 as shown above. The photoconductor 8 is first provided with electrical contacts, and is connected to a test circuit as shown in FIG. 2. To that end, the photoconductor 8 is connected in series with an 18 volt battery as a constant voltage source 9, and in series with a protective resistor 10 of, for example, 1 MΩ. An electrolytic capacitor 11 of 4 µF is connected in parallel with the voltage source 9, and a further capacitor 12, for example, of 100 nF is additionally connected in parallel with the electrolytic capacitor 11. A measuring instrument 14 is connected in parallel with the photoconductor 8 and is coupled to the remainder of the circuit via a third capacitor 13 which may be, for example of 1 µF.

The detector element and the circuitry shown in FIG. 2 are built into a housing composed, for example, of sheet aluminum having a thickness of 0.5 nm, which serves the purpose of shielding the photoconductor 8 against external electrical interference and against stray light.

An oscilloscope having a minimum input sensitivity of 10 µV/cm and a 1 MΩ input impedance can be used as the measuring instrument 14.

The arrangement shown in FIG. 2 is irradiated with chopped x-rays proceeding from the end face of the detector, i.e., proceeding parallel to the electrodes 7.

In the exemplary embodiment, the specimen exhibits a dark resistance of approximately 1 MΩ. Correspondingly, a dark current of approximately 10 µA arises given a field strength of approximately $10^2$ V/cm. The x-ray pulses which are generated have a duration of 2 milliseconds and produced every 45 milliseconds. The x-ray tube which emits the x-ray pulses is placed at a distance 25 cm from the photoconductor 8, and is filtered with sheet aluminum having a thickness of 8 mm. The power of the operating voltage generator for the x-ray tube is varied between 20 kV and 55 kV in order to simulate the different absorptions which occur in a transirradiated body. Specimen signals between 2 volts and 0.1 millivolts are measured at the oscilloscope (measuring instrument 14). This corresponds to a dynamic range of $2 \times 10^4$.

The shape of the measured signal observed at the measuring instrument 14 is approximately rectangular. This permits conclusions to be made regarding the good response of the photoconductor 8 with regard to a rapid decay of the photocurrent following the trailing edge of the x-ray pulse. The signal-to-noise ratio formed by the quotient of the signal current and dark current is defined as $7 \times 10^3$ given a power of 55 kV for the x-ray source.

Further compound semiconductor specimens can be provided with ohmic contacts in the manner set forth above with regard to the gallium arsenide photoconductor 8 shown in FIG. 1, and can be charged with pulsed x-rays in a testing arrangement as shown in FIG. 2. The characteristics in such a testing circuit are modified according to the respective characteristic data of the semiconductor materials forming the photoconductor 8. The following table provides information regarding the measured values thereby obtained.

| 1 Semiconductor Material | 2 Specimen Diameter [mm] | 3 Specimen Thickness [mm] | 4 $U_{specimen}$ [V] | 5 Field Strength [V/cm] | 6 $P_{dark}$ [Ohm/cm] | 7 $U^{*)}$ (signal) [mV] | 8 U (noise) [mV] | 9 S/N |
|---|---|---|---|---|---|---|---|---|
| $Cd_{0.9}Zn_{0.1}Te$ | 8 | 1.7 | 16.5 | $9.7 \cdot 10^1$ | $2.8 \cdot 10^7$ | 60 | $10^{-2}$ | $6 \cdot 10^3$ |
| $Cd\,Te_{0.9}Se_{0.1}$ | 8 | 1.4 | 16.4 | $1.2 \cdot 10^2$ | $3.2 \cdot 10^7$ | 250 | $4 \cdot 10^{-1}$ | $6 \cdot 10^3$ |
| GaAs (216) | 9.2 | 0.6 | 9.1 | $1.5 \cdot 10^2$ | $2.2 \cdot 10^7$ | 700 | 0.1 | $7 \cdot 10^3$ |

*)given 55 kV/5 mA x-ray tube power

The detector element constructed in accordance with the principles of the present invention has a high signal-to-noise ratio of more than $10^3$ in the detection of x-rays even with photoconductors composed of other semiconductor materials other than the type described above in the exemplary embodiment. The same is true for other binary and ternary compound semiconductors which are identified above, but which are not listed in the table.

Because of the high signal-to-noise ratio, which is an indication of the high sensitivity of the detector, the detector element of the invention is particularly suited for conducting x-ray examinations of the human body. Because the detector element directly converts the absorbed x-rays into electrical energy, both the measured conversion efficiency (7%) and the theoretical conversion efficiency (more than 20%) signify the advantages of the detector element compared to known x-ray detectors. Given, for example, scintillation detectors, conversion efficiencies of only up to 4% are measured. The signal-to-noise ratio of the detector of the invention is also better than that of a scintillator followed by a Si-diode.

When the detector element of the invention is employed for medical x-ray examinations, for example, in a computer tomography apparatus, the geometrical quantities of the detector element are optimized in order to obtain as complete as possible absorption of x-rays, and in view of the desired resolution. Dependent on the energy of the incident x-rays, the absorption length, i.e., the length within which the radiation is completely absorbed, amounts, for example, to 2 mm for gallium arsenide, and is approximately 1 mm for cadmium telluride. A suitable detector element can then be constructed having a semiconductor body whose "depth" measured parallel to the incident radiation is slightly larger than the aforementioned absorption length. The thickness of the lamina-shaped semiconductor body is selected according to the desired resolution. Known computer tomography systems have a resolution grid of approximately 1 mm, which is also desired for the detector element of the invention.

In a tomography apparatus, the individual detectors are arranged parallel to each other to form detector lines or detector arrays. In order to prevent a number of detector elements from responding to a single x-ray quantum, a radiation-tight separation of the individual detector elements is required. This can be achieved using highly absorbent separating elements between the individual detectors. For example, separating plates formed of heavy metal are well-suited for this purpose. The goal is to thereby optimize the ratio of actively useable detector area to non-active detector area because this ratio, in addition to the absolute grid size, determines the sensitivity of the detector element.

An x-ray examination using the detector element of the invention can ensue, for example, in a continuous mode. The variation of the incident x-rays can be measured with the aforementioned measuring instrument, or under the recited measuring conditions. It is preferable, however, to implement the x-ray examination in a pulsed mode, which permits absolute values for the strength of the incident radiation to be determined by balancing, as is required for registering a digital x-ray image.

In addition to operating using a d.c. voltage source (for example, a charge accumulator), a.c. sources can be employed as long as the measurement ensues phase-synchronously with the a.c. source, or the voltage charging of the photoconductor is maintained in phase with the a.c. source such as by triggering.

Although modifications and changes may be suggested by those skilled in the art, it is the intention of the inventors to embody within the patent warranted hereon all changes and modifications as reasonably and properly come within the scope of their contribution to the art.

We claim as our invention:

1. An x-ray detector comprising:

a photoconductor formed by a lamina having a crystalline, semi-insulating semiconductor body having high purity in its interior, said semiconductor body being formed of material selected from the group consisting of GaAs, CdTe, CdSe, HgTe, $CuIn_xGa_{1-x}Se_{2-2y}S_{2y}$, wherein $1 \geq x$ and $y \geq 0$, said semiconductor body having opposite surfaces;

electrodes respectively disposed on said opposite surfaces of said semiconductor body and defining an input surface for x-rays, said input surface being substantially perpendicular to said opposite surfaces;

said semiconductor body having a flat, highly doped layer region immediately beneath the electrode at each of said opposite surfaces;

a capacitor;

a constant voltage source electrically connected in parallel with said capacitor and connected to said electrodes for charging said electrodes with a constant voltage and producing a substantially uniform electric field throughout said semiconductor body between said electrodes; and measuring means for detecting a photocurrent flowing through said photoconductor as a result of x-rays incident on said input surface of said photoconductor.

2. An x-ray detector as claimed in claim 1 further comprising a protective resistor connected in series with said photoconductor, and wherein said measuring means comprises a high impedance measuring means, and said x-ray detector further comprising means for capacitatively coupling said high-impedance measuring means to said photoconductor.

3. An x-ray detector as claimed in claim 1 wherein said semiconductor body has a resistivity of more than $10^7$ ohm-cm.

4. An x-ray detector as claimed in claim 1 wherein said photoconductor comprises means for producing an output signal having a signal-to-noise ratio of more than $10^3$ at room temperature.

5. An x-ray detector as claimed in claim 1 wherein said semiconductor body comprises undoped, monocrystalline GaAs.

6. An x-ray detector as claimed in claim 1 wherein each of said electrodes comprises a layer sequence proceeding from said semiconductor body having a first layer disposed directly on said semiconductor body consisting of $n^+$GaAs, a second layer consisting of Ge covering said first layer, a third layer consisting of Au covering said second layer, a fourth layer consisting of Ni covering said third layer, and a fifth layer consisting of Au covering said fourth layer.

7. A method for detecting x-rays comprising the steps of:

producing a laminar, crystalline, semi-insulating semiconductor body with high purity in its interior having opposite surfaces and selecting material for said semiconductor body from the group consisting of GaAs, CdTe, CdSe, HgTe, $CuIn_xGa_{1-x}Se_{2-2y}S_{2y}$, wherein $1 \geq x$ and $y \geq 0$;

producing a flat, highly doped layer region on each of said opposite surfaces of said semiconductor body;

disposing an electrode on each of said opposite surfaces of said semiconductor body directly covering said highly doped layer region to form a photoconductor;

orienting said photoconductor with said electrodes substantially parallel to incoming x-rays;

charging said electrodes with a constant voltage in a range between 8 and 30 volts, and producing a substantially uniform electric field throughout said semiconductor body between said electrodes, said photoconductor thereby generating a photocurrent as a result of x-rays incident thereon;

connecting a measurement device for said photocurrent in parallel with said photoconductor and capacitively coupling said measuring device to said photoconductor; and measuring said photocurrent with said measuring device.

8. A method as claimed in claim 7 comprising the additional step of irradiating said photoconductor with chopped x-rays.

9. A method as claimed in claim 7 comprising the additional step of operating said photoconductor at room temperature.

10. A method as claimed in claim 7 comprising the additional step of disposing said photoconductor in a detector array of a computer tomography apparatus.

* * * * *